US012070958B2

(12) United States Patent
Palumbo

(10) Patent No.: US 12,070,958 B2
(45) Date of Patent: Aug. 27, 2024

(54) DIGITAL PRINTING DEVICE WITH INTEGRATED INK COLLECTION DEVICE

(71) Applicant: NEOS S.r.l., Fiorano Modenese (IT)

(72) Inventor: Vincenzo Palumbo, Fiorano Modenese (IT)

(73) Assignee: NEOS S.r.l., Fiorano Modenese (IT)

( * ) Notice: Subject to any disclaimer, the term of this patent is extended or adjusted under 35 U.S.C. 154(b) by 0 days.

(21) Appl. No.: 17/436,303

(22) PCT Filed: Mar. 5, 2020

(86) PCT No.: PCT/EP2020/055800

§ 371 (c)(1),
(2) Date: Sep. 3, 2021

(87) PCT Pub. No.: WO2020/178367

PCT Pub. Date: Sep. 10, 2020

(65) Prior Publication Data

US 2022/0176720 A1 Jun. 9, 2022

(30) Foreign Application Priority Data

Mar. 5, 2019 (EP) .................................... 19425010

(51) Int. Cl.
*B41J 25/00* (2006.01)

(52) U.S. Cl.
CPC .................................. *B41J 25/001* (2013.01)

(58) Field of Classification Search
None
See application file for complete search history.

(56) References Cited

U.S. PATENT DOCUMENTS

| | | | | |
|---|---|---|---|---|
| 6,217,145 | B1 | 4/2001 | Ito et al. | |
| 7,824,004 | B2 * | 11/2010 | Tokuno | B41J 2/16552 347/29 |
| 2017/0313108 | A1 | 11/2017 | Profaca et al. | |
| 2018/0243785 | A1 | 8/2018 | Ferrarri | |
| 2018/0257378 | A1 | 9/2018 | Kinoshita | |

OTHER PUBLICATIONS

Written Opinion of the International Searching Authority issued in connection with PCT/EP2020/055800.
International Search Report, issued in connection with PCT/EP2020/055800.

* cited by examiner

*Primary Examiner* — Alejandro Valencia
(74) *Attorney, Agent, or Firm* — Akerman LLP

(57) ABSTRACT

A digital printing device, arranged to print onto a printing medium that is relatively movable with respect to a fixed frame in an advancement direction; comprising at least one printing module and equipped with at least one print head (4) whose nozzle plate (5) is arranged to print and at least one collection member (6), so shaped at the top as to define a collection tank (8); wherein said collection member (6) and said printing module are relatively movable with respect to each other so as to be able to take at least two alternative configurations, among which: at least one collection configuration, in which said collection member (6) is located below said printing module; and a printing configuration in which said collection member (6) is side by side, along said advancement direction, with the printing module.

14 Claims, 5 Drawing Sheets

1
2
3
9
10
18
19
20
S
X 1
3
9
10
29
S
Z 4
5
6
7
8
9
12
13
14
17
S

DIGITAL PRINTING DEVICE WITH INTEGRATED INK COLLECTION DEVICE

CROSS-REFERENCE TO RELATED APPLICATIONS

This application is a national phase of PCT/EP2020/055800, filed Mar. 5, 2020, and claims priority to EP 19425010.6, filed Mar. 5, 2019, the entire contents of both of which are hereby incorporated by reference.

FIELD OF APPLICATION

The present invention relates to a digital printing device, in particular of the type comprising a system for collecting ink from the nozzle plate in non-operating conditions.

In particular, the invention can find a useful application in several technological fields where industrial printing is required on surfaces of various type, for example in the printing on paper, corrugated cardboard, cardboard, plastic film, thermoplastic sheets; namely in the printing of labels, packaging, signs or even ceramic coatings, glass materials, wood or metal supports.

BACKGROUND ART

Industrial printing devices generally comprise one or more printing modules equipped with print heads, intended to deposit ink drops onto a printing medium that travels below the printing modules themselves.

Said printing devices generally comprise removable lids, arranged to close the printing modules in non-operating conditions. The lids seal the nozzle plate, so as to prevent ink from dripping to the ground and to protect the nozzles themselves from impacts and/or contaminations. These lids are connected to a suction system, arranged to remove the collected ink from the lid itself.

Furthermore, the above printing devices can provide a cleaning system of the nozzles of the heads. These cleaning systems normally use a cleaning bar, that is translated below the nozzle plate in the context of a dedicated cleaning operation. This operation provides for a purge action of the head obtained by imposing a positive pressure in the ink circuit thereof.

The above-described digital printing devices, although substantially meeting the field requirements, comprise nevertheless some drawbacks unsolved to date.

A first drawback is determined by the dimensions of the removable lids of the printing modules, that force to adopt technically complex design solutions and/or compromises concerning the convenience of use and size of the machine.

A second drawback specifically relates to the nozzle cleaning phase, necessarily performed with the lids removed from the print heads. In this phase, the ink leaking from the head thus falls below the head, compromising the cleaning of the machine and of the environment in which it is accommodated.

A third drawback finally relates to the printing quality, that can be affected by the leakage of excess ink drops that do not adhere to the printing medium and that should be promptly removed by a local suction action. This drawback can be solved by adopting dedicated suction stations downstream of the single nozzle plates, but at the cost of a further construction complexity of the device.

Documents US 2017/313108 A1, US 2018/243785 A1, U.S. Pat. No. 6,217,145 B1 and US 2018/257378 disclose printing devices according to the prior art.

Therefore, the technical problem underlying the present invention is to solve the drawbacks encountered in the devices known to date, providing in particular a compact and easy-to-use digital printing device, nonetheless equipped with a device for collecting ink from the nozzle plate in non-operating conditions.

SUMMARY OF THE INVENTION

The above-identified technical problem is solved by a digital printing device, comprising:

a fixed frame;

a support portion;

at least two printing modules that are integral with said support portion and equipped with at least one print head whose nozzle plate faces, in use, a printing area underlying the printing module;

each printing module having a respective collection member so shaped at the top as to define a collection tank;

wherein said digital printing device is arranged to print onto a printing medium that is relatively movable with respect to the fixed frame through said printing area in an advancement direction;

wherein said printing modules are subsequently aligned along the advancement direction;

wherein said collection members and said printing modules are relatively movable with respect to each other so as to be able to take at least two alternative configurations, among which:

at least one collection configuration, wherein each collection member is located below the nozzle plate of the respective printing module, the collection tank being arranged to collect liquids dropping therefrom; and a printing configuration in which each collection member is shifted, toward a same side along the advancement direction, with respect to its respective printing module, so that each collection member is side by side along said advancement direction with a lower portion of the printing module, and it is placed above the plane on which the nozzle plate lies each collection member except a last one being thus housed in a recess obtained between its respective printing module and a following printing module.

Therefore, the invention adopts a collection member that is relatively movable with respect to the printing module or modules, that is suitably placed, during printing operations, in a side-by-side position where it neither interferes with the functions of the machine nor contributes to the dimensions thereof.

In particular, the collection members—obviously except for the last one—are suitably housed in recesses obtained between the end portions of the subsequent printing modules.

The above collection configurations of the collection member can comprise at least one rest configuration, in which said collection tank is located next to the nozzle plate and it defines a lower cover of the printing module.

In this way, it avoids resorting to a further and distinct lid for the sealing of the nozzle plate in offline conditions.

Preferably, in the rest configuration the lid defined by the collection tank is arranged to keep the nozzle plate in a controlled-humidity volume, so as to prevent the ink inside the print head from drying.

Advantageously, the collection tank can have a peripheral upper edge intended to abut against the corresponding printing module in a rest configuration, surrounding the nozzle plate.

The digital printing device can comprise a cleaning bar that is translationally movable below the nozzle plate to perform a cleaning thereof.

In this case, the collection configurations can advantageously comprise a cleaning configuration, in which said collection tank is located at a predetermined distance from the nozzle plate, said predetermined distance being sufficient to allow the passage of the cleaning bar between the collection tank and the nozzle plate.

The collection tank thus avoids the dropping and dispersion of the cleaning liquid and/or of the purge ink used in the head cleaning procedure, preserving the cleanliness of the printing device and of the room where it is.

Advantageously, the collection member can have at the bottom a suction opening. In the printing configuration, said suction opening is positioned downstream, with reference to the advancement direction of the printing medium, with respect to the nozzle plate, to suck excess ink particles released by the nozzle plate above the printing medium. In other words, the suction acts on the printing medium after the ink deposition by the respective printing module, and it allows excess ink to be removed before reaching a subsequent printing module.

The collection member has in this case a double function, taking advantage of the presence of an internal suction duct that is anyway useful for discharging the ink drops fell in the collection tank. The presence of a suction downstream of the nozzle plate ensures a better printing quality.

Preferably, the support portion is translationally movable, with respect to the fixed frame, along a first direction—indicatively vertical—that is orthogonal to the advancement direction of the printing medium, and said collection member is translationally movable, with respect to the fixed frame, at least along a second direction—indicatively horizontal—that is parallel to the advancement direction of the printing medium.

Still preferably, said collection member is also translationally movable along the first direction so as to be able to adapt its position to the one of the support portion. The coupled position with the collection members nested in the respective recesses above the plane which the nozzle plates lie on can thereby be kept even varying the height of the support portion. In this case, for example, a cleaning operation can be provided through the above cleaning bar, that also concerns the lower surface of the collection members.

To achieve the aforesaid translations, linear actuating means can be provided, for example electric motors or hydraulic or pneumatic jacks: in particular first linear actuating means to raise and lower the support portion in the first direction, second linear actuating means to move back and forth the collection member along the second direction, and third linear actuating means to raise and lower the collection member in the first direction.

The cleaning bar, if any, is preferably translationally movable, with respect to the fixed frame, along a third direction that is orthogonal to the first direction and to the second direction.

Fourth linear actuating means can be provided to move the cleaning bar along the third direction. Preferably, the cleaning bar is constrained to the support portion with respect to the translation in the first and in the second direction, and it is movable with respect thereto along the third direction.

As outlined above, the printing modules are a plurality, subsequently aligned along the advancement direction of the printing medium. The collection members are a corresponding plurality, a respective collection member being provided for each printing module.

The collection members are preferably gathered in an assembly that is integrally movable with respect to the fixed frame. This assembly preferably comprises two side longitudinal members that connect the opposed ends of the different collection members to each other; one of these longitudinal members can accommodate a suction manifold connected to a vacuum source.

Each collection member has preferably a prevalent expansion direction in a transverse direction that is orthogonal to the advancement direction of the printing medium.

Preferably, each collection member internally comprises a suction chamber connected to suction means, that can comprise a common side manifold housed in a longitudinal member connecting the subsequent collection members.

The suction opening, if any, puts said suction chamber in communication with the outside.

The suction opening can have a peripheral projection on the face inside the suction chamber to prevent the liquid contained in the suction chamber from dropping through the suction opening.

At least one drain opening communicating with the inside of the suction chamber can be defined on the bottom of said collection tank.

The collection tank can be defined by at least two flaps converging towards the drain opening or openings.

In a preferred embodiment, the drain openings are a plurality of holes arranged along the convergence of said flaps.

Further features and advantages will become more apparent from the following detailed description of a preferred, but not exclusive, embodiment of the present invention, with reference to the enclosed figures given by way of non-limiting example.

DETAILED DESCRIPTION

Figure 1:
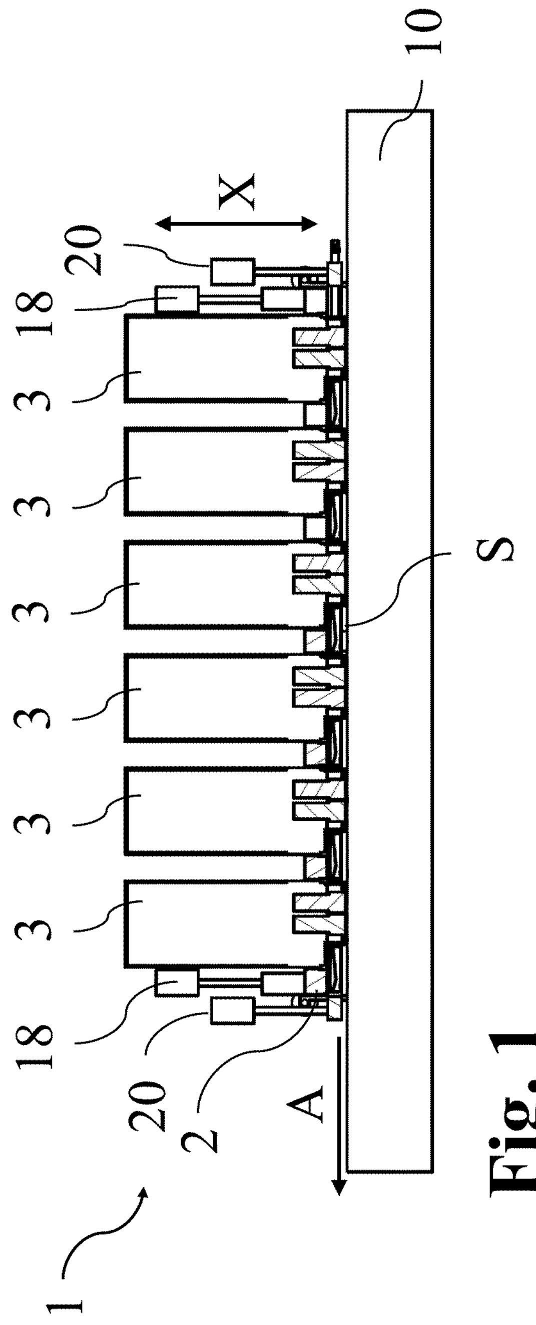
FIG. 1 shows a suitably-simplified side sectional view of a digital printing device according to the present invention in a printing configuration.

With reference to the attached FIGS. 1-10, a digital printing device according to the present invention is globally identified with 1.

This digital printing device 1 is schematically illustrated in the above figures, with omission of some construction elements known per se such as the upper and lower cases and graphic simplification of the represented elements.

Hereafter in the description, terms like above, below, lower, upper, or derivatives thereof are to be understood with reference to the normal configuration of use of the digital printing device 1 illustrated in the aforesaid figures.

With reference to the configuration of use of the digital printing device 1 three orthogonal directions are further defined: a first direction or vertical direction X; a second direction or longitudinal direction Y that is parallel to the advancement direction A of a printing medium during printing operations; finally a third direction or transverse direction Z that is orthogonal to the first two.

The digital printing device 1 comprises in a known manner a fixed frame 10, that the figures represent in a simplified manner as a parallelepiped base.

On said fixed frame 10 a printing area S is defined, that is represented in the preferred embodiment by a planar path along which an unrepresented printing medium is moved forward—along the above—defined advancement direction A—through advancement means known per se.

The digital printing device comprises a plurality of printing modules 3, supported in an overhanging manner above the printing area S by a support portion 2. The printing modules 3 follow each other along the longitudinal direction Y, and they are substantially juxtaposed to each other.

Each printing module 3 has a lower portion 17 that expands close to the printing area S and that houses one or more print heads 4. These print heads 4 are naturally turned with the nozzles towards the printing area; the operating surface of the nozzles is identified hereinafter as the nozzle plate 5.

The support portion 2, due to first linear actuating means 18 of a known type, is translatable along the vertical direction X with respect to the main frame 10 of the machine.

In particular, as it will better appear from the following description, the support portion 2 can take at least three different positions, that correspond to three different heights of the nozzle 5 surfaces above the printing area S: a totally lowered position; an intermediate position; and a totally raised position.

The digital printing device 1 further comprises, for each printing module 3, a corresponding collection member 6 whose function will better appear hereafter in the present description.

The collection members 6 have a prevalent linear expansion along the transverse direction Z, and they are jointed to each other by two side longitudinal members that connect the ends thereof so as to define a grid assembly 11.

The single collection member 6 has at the top two hopper-like sloping flaps 15 that define a collection tank 8, on whose bottom a plurality of drain openings 14 in the form of equally-spaced holes open, that communicate with a suction chamber 12 inside the element and extended along the whole axial expansion thereof.

The collection tank 8 is overlapped by an embossed peripheral edge 16, having a rectangular geometry.

The lower face of the collection member 6 is instead flat, traversed by a suction opening 7 that puts it in communication with said suction chamber 12.

The suction opening 7 is preferably configured as a continuous slot that runs along the whole body of the collection member 6, in a transverse direction.

A projecting flap 13 is suitably arranged on the intrados of the suction opening 7, that allows the leakage of liquid coming from the suction chamber 12 to be avoided.

It is worth noting that the collection member 6 has an asymmetric transverse profile; in fact both the suction opening 7 and the convergence of the flaps 15 of the collection tank 8 do not lie along the profile midline, but they are offset upstream with respect to the advancement direction A of the printing medium.

The different suction chambers 12 of the assembly 11 lead all into a common suction manifold, that is connected in turn to a vacuum source.

The whole assembly 11 is laterally supported by horizontal guides, and it is movable with respect to the fixed frame 10. In particular, both second linear actuating means 19, that allow the translation back and forth along the longitudinal direction Y, and third linear actuating means 20, that allow instead the raising and lowering along the vertical direction X are provided.

A cleaning bar 9, that linearly develops below the printing modules 3 along the whole longitudinal direction Y, is associated with the above—described support portion 2. In other words, the cleaning bar 9 extends below the printing modules 3 transversely thereto.

Said cleaning bar 9 is mounted at the two opposed ends thereof on lines 21 that are integral with the support portion 2 and it is therefore able to translate, by the action of fourth linear actuating means 29, along the transverse direction Z below the printing modules 3.

The cleaning bar 9 is usually in a rear limit stop position in which it interferes neither with the plane that defines the printing area S, nor with the assembly 11 of the collection members 6. Only when the support portion 2 is in a raised position and the collection assembly 6 is not just below the printing modules 3, the cleaning bar 9 can freely slide below these printing modules 3 without mechanically interfering with the two above elements.

The cleaning bar 9 comprises a plurality of cleaning heads 22, each of them is arranged to clean the nozzle plate 5 of a specific printing module 3.

The cleaning heads 22 are mounted in a floating manner with respect to a fixed bar body 23, namely they are able to adapt their height to the one of the overlying printing module 3.

Actually, the single cleaning head 22 is a box-like element equipped with side eyelets 25 into which two pins 24, that are integral with the bar body 23, are introduced. A compression spring 26, that pushes the cleaning head 22 upwards, is fit around the pin 24, between the bar body 23 and the side eyelet 25. At the top, the cleaning head has two side rollers 27, serving as contour followers, that keep in contact with respective tracks made below the printing module 3, on each side of the nozzle plate 5.

The cleaning head 22 has at the top, between the two side rollers, a cusp-like portion culminating with a suction slot 28. The cleaning head 22 is in fluid communication with a suction manifold that runs along the bar body 23, said manifold being connected in turn to a vacuum source.

Due to the floating structure with spring and contour followers, the cleaning head 22 keeps at a predetermined distance from the printing module 3 overhanging it, and in particular the suction slot 28 is positioned at a short distance below the nozzle plate 5, and it can carry out its suction action thereon without any risk of contact that could damage the nozzles themselves.

The assembly 11 that bears the collection members 6 and the support portion 2 that supports the printing modules 3 can take different mutual positions, corresponding to the configurations described hereinafter.

Figure 3:
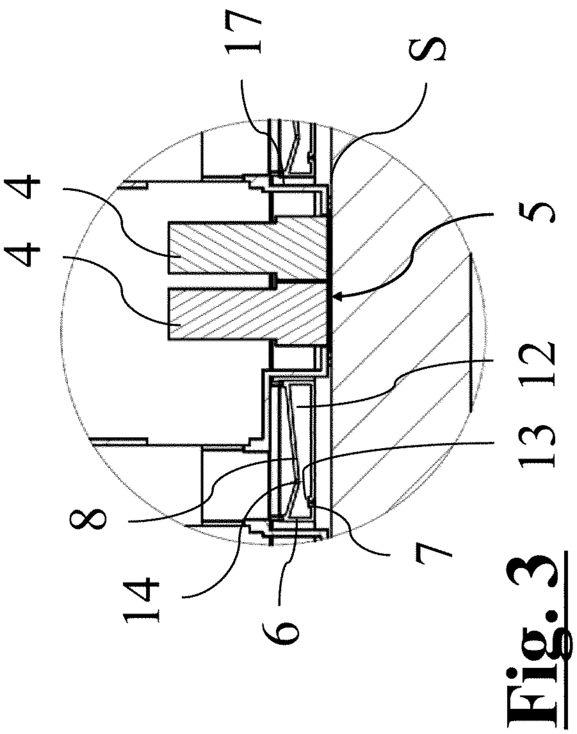
FIG. 3 shows an enlarged detail of FIG. 1.
Figure 2:
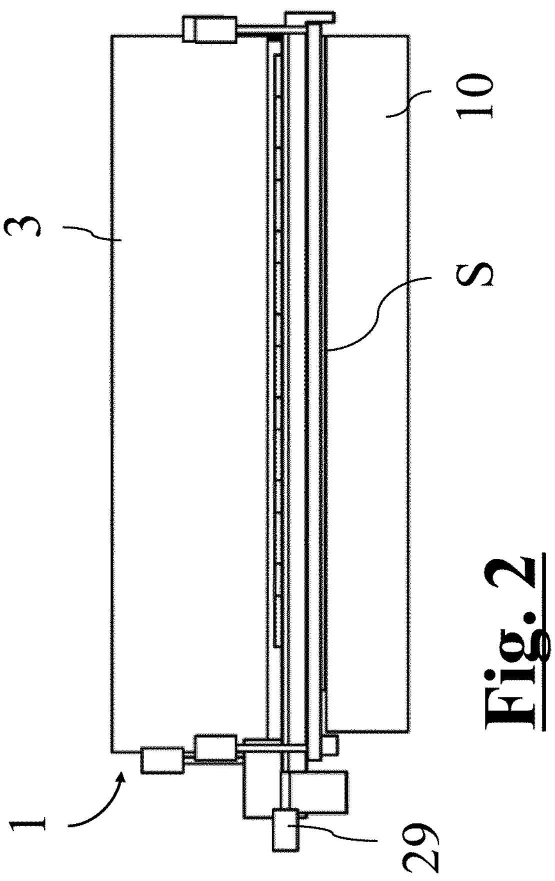
FIG. 2 shows a front view of the digital printing device in the configuration of FIG. 1.

In a printing configuration, illustrated in the enclosed FIGS. 1-3, the support portion 2 is in a totally lowered position and the collection members 6 are offset with respect to the lower portions 17 of the printing modules 3.

In this configuration, the collection members 6 fit into appropriate recesses obtained between the subsequent lower portions 17 of the printing modules 3. The nozzle 5 surfaces open next to the printing area S, as well as the suction openings 7 of the collection members 6.

This configuration allows the printing onto a printing medium to be performed, wherein the suction openings 7 provide to remove the excess ink in the passage between a print head 4 and the subsequent one.

Figure 4:
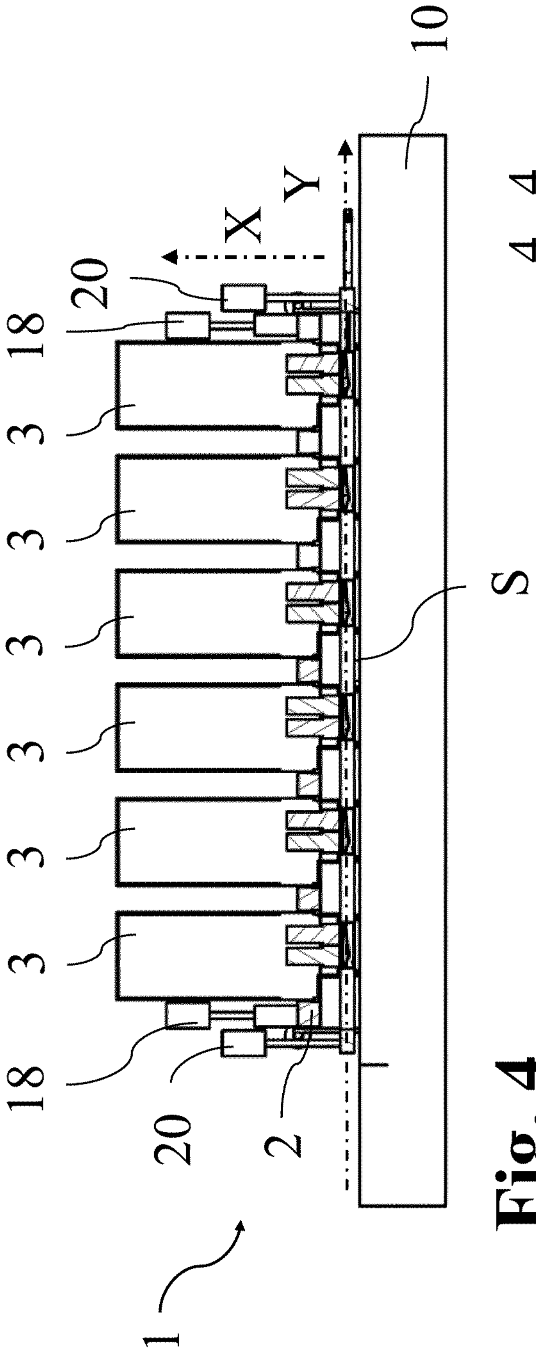
FIG. 4 shows a suitably-simplified side sectional view of the digital printing device of FIG. 1 in a rest configuration.
Figure 6:
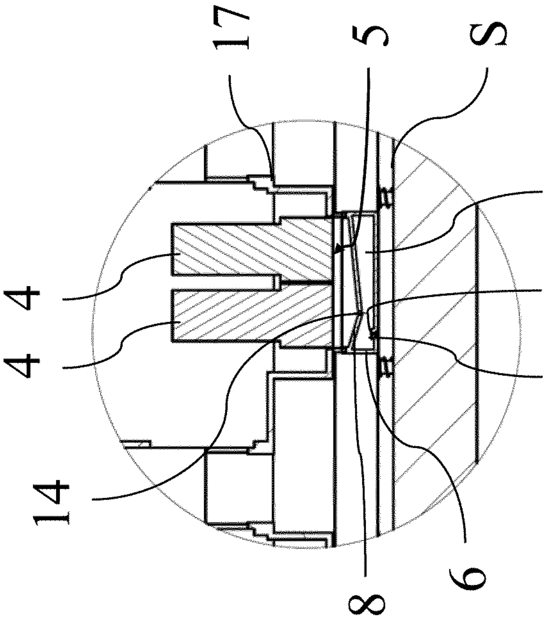
FIG. 6 shows an enlarged detail of FIG. 4.
Figure 5:
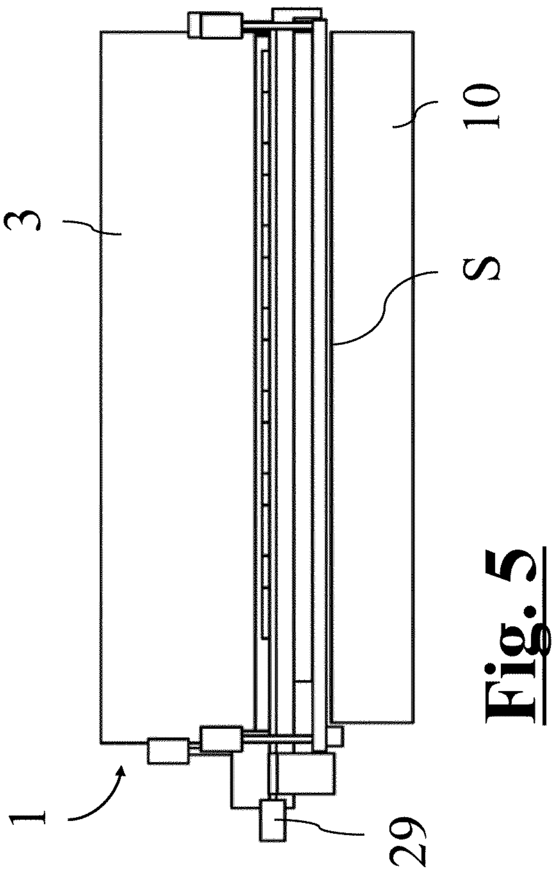
FIG. 5 shows a front view of the digital printing device in the configuration of FIG. 4.
Figures 7, 8, 9:
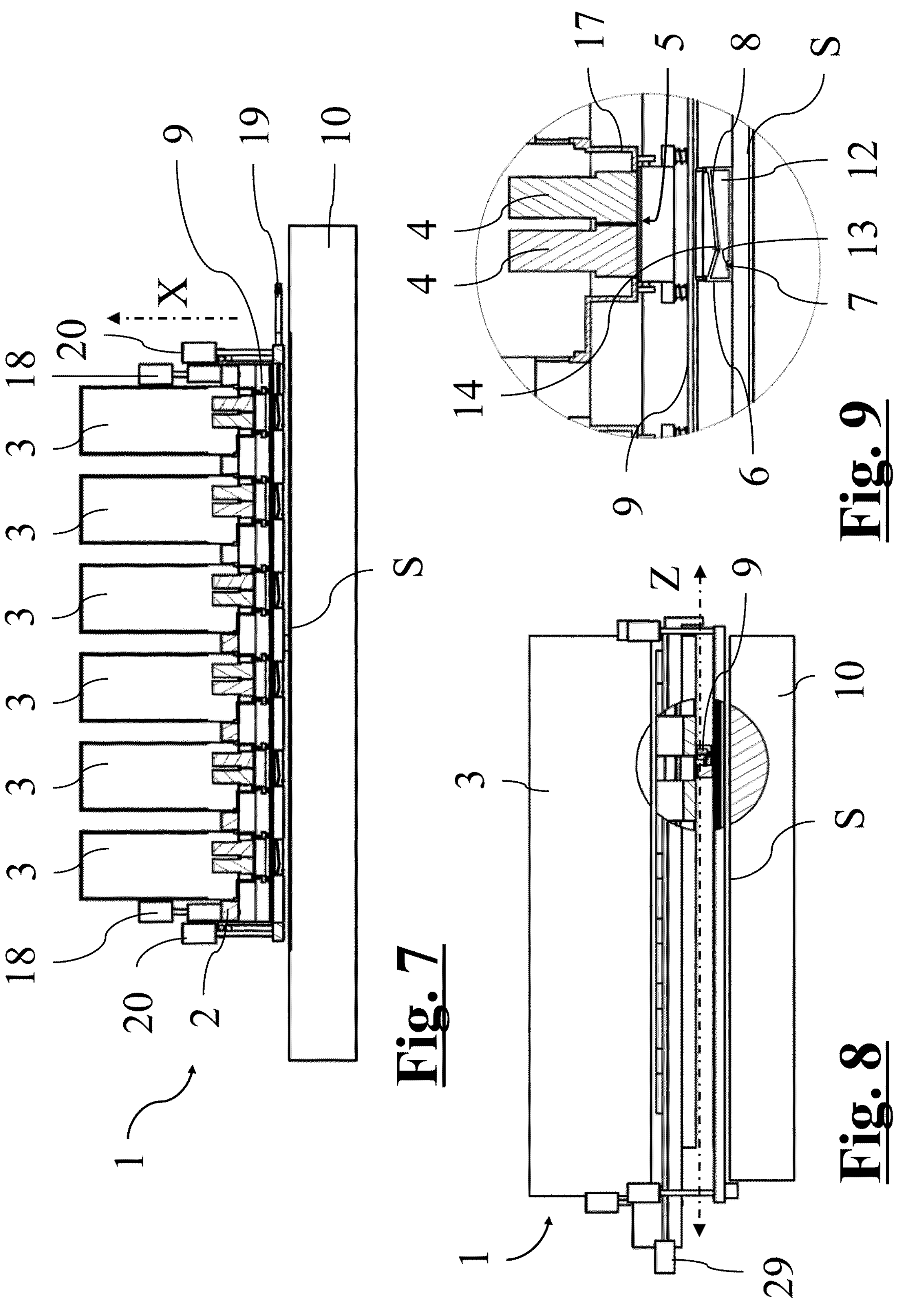
FIG. 7 shows a suitably-simplified side sectional view of the digital printing device of FIG. 1 in a cleaning configuration.
FIG. 8 shows a front view of the digital printing device in the configuration of FIG. 7.
FIG. 9 shows an enlarged detail of FIG. 7.
Figure 10:
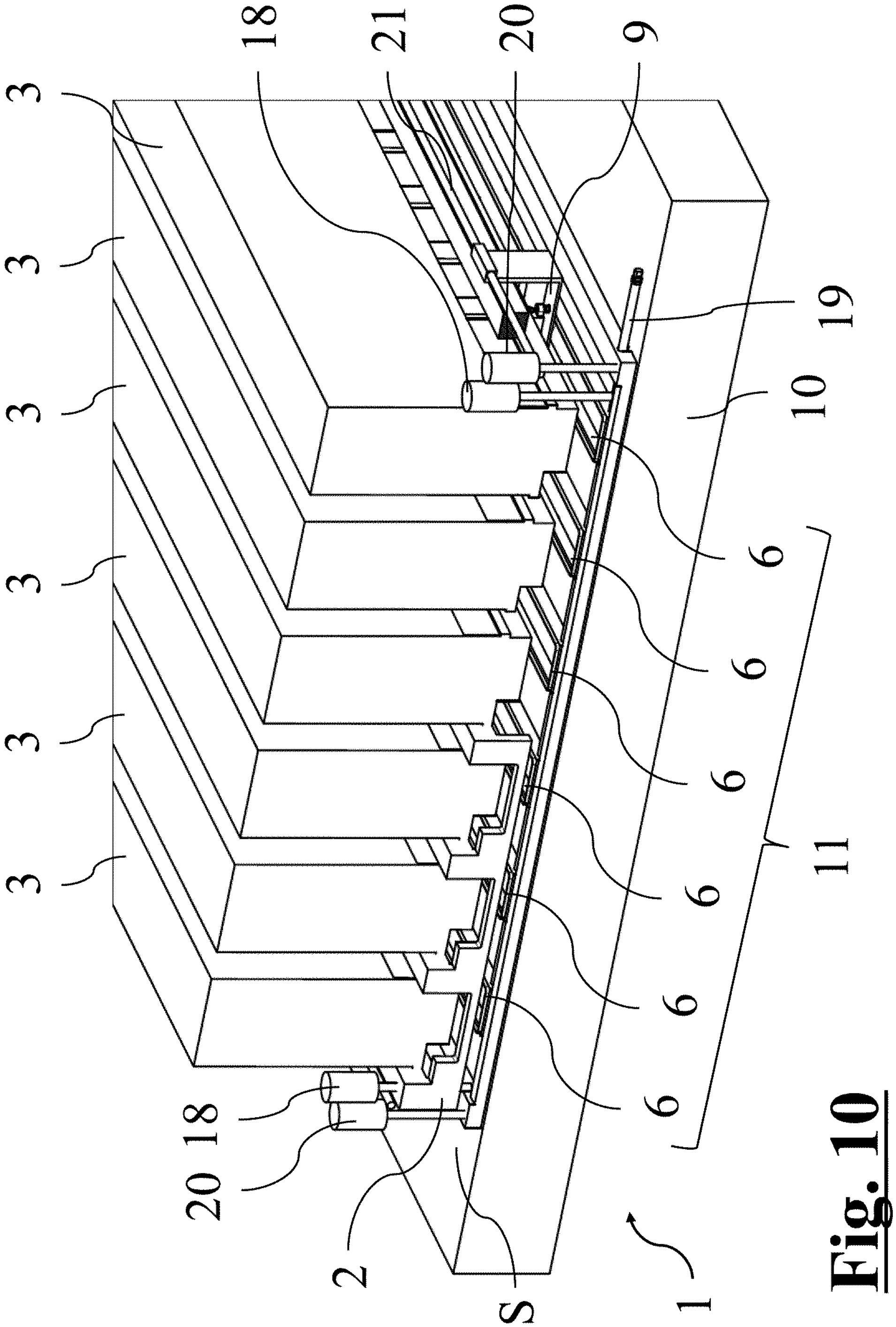
FIG. 10 shows a perspective view of the digital printing device in the configuration of FIG. 7.
Figure 12:
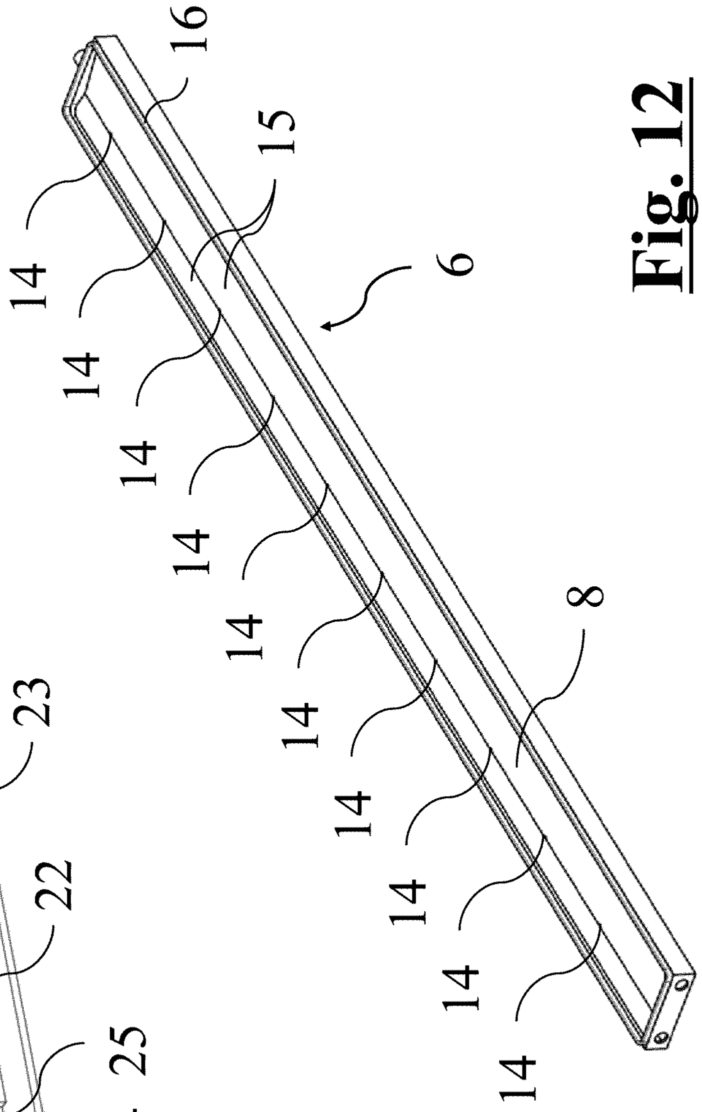
FIG. 12 shows a perspective view of a collection member of the digital printing device of FIG. 1.
Figure 11:
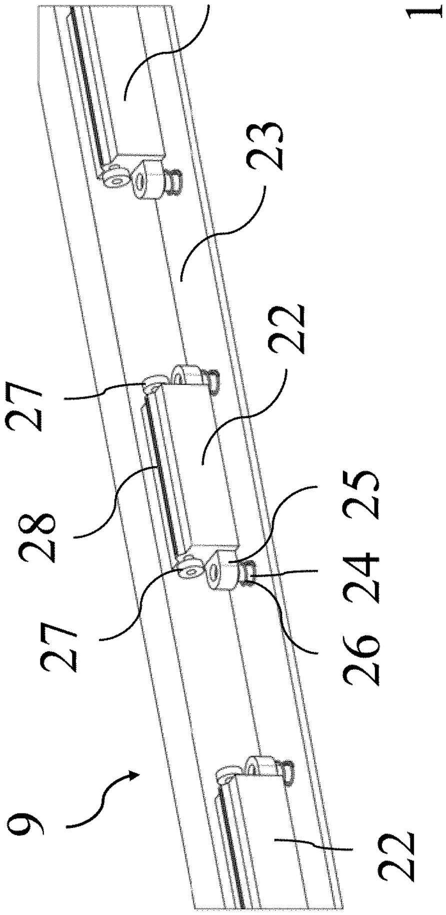
FIG. 11 shows a perspective view of an enlarged detail of a cleaning bar of the digital printing device of FIG. 1.

In a rest configuration, illustrated in the enclosed FIGS. 4-6, the support portion 2 is in an intermediate position and the collection members 6 are aligned with respect to the lower portions 17 of the printing modules 3.

In this configuration, the peripheral edge 16 of the collection member 6 abuts against a neighbourhood of the nozzle plate 5, so that the collection tank defines a protection lid of the respective printing module 3.

A controlled-humidity atmosphere is achieved inside this protection lid, so as to avoid any risk of ink drying.

In a cleaning configuration, illustrated in the enclosed FIGS. 7-10, the support portion 2 is in a totally raised position and the collection members 6 are aligned with respect to the lower portions 17 of the printing modules 3.

In this configuration, the printing modules 3 are at some distance from the collection members 6, allowing the passage of the cleaning bar 9 in the transverse direction Z. The cleaning of the nozzle plate 5 can thus be achieved. In operation, a positive pressure, that defines an ink purge, is imposed on the print heads 4; the suction of the cleaning heads 22 thus creates a vortex with a cleaning action on the nozzles.

The collection tanks 8 are in this case suitably positioned below the nozzle 5 surfaces during cleaning operations, and they can thus collect the dropping ink.

Obviously, in order to meet contingent and specific requirements, a person skilled in the art will be allowed to bring several changes and modifications to the above-described invention, all however contained in the scope of protection of the invention as defined by the following claims.

What is claimed is:

1. A digital printing device, comprising:

a fixed frame;

a support portion;

a plurality of printing modules comprising at least a first printing module and a second printing module, said plurality of printing modules being fixedly attached to said support portion above a printing area;

a plurality of collection members comprising at least a first collection member and a second collection member;

wherein said first printing module has a lower portion and comprises a plurality of first nozzles and a first nozzle plate which face, in use, the printing area;

wherein said second printing module has a lower portion and comprises a plurality of second nozzles and a second nozzle plate which face, in use, the printing area;

wherein the first collection member defines a first collection tank, said first collection tank opening upwards;

wherein the second collection member defines a second collection tank, said second collection tank opening upwards;

wherein the first collection member comprises a first suction opening;

wherein the second collection member comprises a second suction opening;

wherein said digital printing device is arranged to print onto a printing medium that is relatively movable with respect to the fixed frame through said printing area in an advancement direction;

wherein said plurality of printing modules are aligned along the advancement direction;

wherein said plurality of collection members and said plurality of printing modules are relatively movable with respect to each other so as to be able to take at least two alternative configurations, including:

at least one collection configuration, wherein:

the first collection member is located below the first nozzle plate, the first collection tank being arranged to collect liquids dropping from the first printing module;

the second collection member is located below the second nozzle plate, the second collection tank being arranged to collect liquids dropping from the second printing module; and a printing configuration, wherein:

said first collection member is shifted, toward a first side along the advancement direction, with respect to the first printing module, so that the first collection member is side by side along said advancement direction with the lower portion of the first printing module and the first suction opening opens above the printing area;

said second collection member is shifted, toward said first side along the advancement direction, with respect to the second printing module, so that the second collection member is side by side along said advancement direction with the lower portion of the second printing module and the second suction opening opens above the printing area;

at least said first collection member is housed in a recess obtained between the first printing module and the second printing module;

wherein at least a suction device is provided which, in said printing configuration, is configured to suck upwards, through said first suction opening and said second suction opening, excess ink particles released by the first nozzles and by the second nozzles in the printing area above the printing medium.

2. The digital printing device according to claim 1, wherein said at least one collection configuration comprise at least one rest configuration, in which: said first collection tank is located below the first nozzle plate and it defines a lower cover of the first printing module; said second collection tank is located below the second nozzle plate and it defines a lower cover of the second printing module.

3. The digital printing device according to claim 2, wherein said first collection tank has a top peripheral edge intended to abut against the first printing module in a rest configuration, surrounding the first nozzle plate and said second collection tank has a top peripheral edge intended to abut against the second printing module in a rest configuration, surrounding the second nozzle plate.

4. The digital printing device according to claim 1, further comprising a cleaning bar that is translationally movable below both the first nozzle plate and the second nozzle plate to perform a cleaning thereof; wherein said at least one collection configuration comprise a cleaning configuration, in which said first and second collection tanks are located at a predetermined distance below the first and second nozzle plates, said predetermined distance being sufficient to allow the passage of the cleaning bar between the first and second collection tanks and the first and second nozzle plates.

5. The digital printing device according to claim 1, wherein said support portion is translationally movable, with respect to the fixed frame, along a first vertical direction that is orthogonal to the advancement direction of the printing medium and said plurality of collection members is translationally movable, with respect to the fixed frame, along at least one second direction that is parallel to the advancement direction of the printing medium.

6. The digital printing device according to claim 5, wherein said plurality of collection members is also translationally movable, with respect to the fixed frame, along the first direction so as to be able to adapt a position thereof to the one of the support portion.

7. The digital printing device according to claim 5, wherein said plurality of collection members is also translationally movable, with respect to the fixed frame, along the first vertical direction so as to be able to adapt a relative height thereof to the one of the support portion, and wherein said cleaning bar is translationally movable, with respect to the fixed frame, along a third direction that is orthogonal to the first direction and to the second direction.

8. The digital printing device according to claim 7, wherein said plurality of collection members is gathered in an assembly that is integrally movable with respect to the fixed frame.

9. The digital printing device according to claim 1, wherein said first and second collection members are elongated in a transverse direction that is orthogonal to the advancement direction of the printing medium.

10. The digital printing device according to claim 1, wherein said first collection member internally comprises a first suction chamber connected to the suction device and wherein, on a bottom of said first collection tank, at least one first drain opening communicating with an inside of said first suction chamber is defined; and wherein said second collection member internally comprises a second suction chamber connected to the suction device and wherein, on a bottom of said second collection tank, at least one second drain opening communicating with an inside of said second suction chamber is defined.

11. The digital printing device according to claim 10, wherein said first collection tank is defined by at least two first flaps converging towards the first drain opening; and wherein said second collection tank is defined by at least two second flaps converging towards the second drain opening.

12. The digital printing device according to claim 1, wherein the first collection member internally comprises a first suction chamber connected to the suction device; wherein, on a bottom of said first collection tank, at least one first drain opening communicating with an inside of said first suction chamber is defined; wherein said first suction opening puts in communication said first suction chamber with an outside of said first suction chamber; wherein the second collection member internally comprises a second suction chamber connected to the suction device; wherein, on a bottom of said second collection tank, at least one second drain opening communicating with an inside of said second suction chamber is defined; and wherein said second suction opening puts in communication said first suction chamber with an outside of said second suction chamber.

13. The digital printing device according to claim 12, wherein said first suction opening has a peripheral projection on a face inside the first suction chamber to prevent the liquid contained in the first suction chamber from dropping through the first suction opening; and wherein said second suction opening has a peripheral projection on a face inside the second suction chamber to prevent the liquid contained in the second suction chamber from dropping through the second suction opening.

14. The digital printing device according to claim 1, wherein, in the printing configuration, above a plane on which the second nozzle plate lies, the first collection member is located above a plane on which the first nozzle plate lies and the second collection member is located above a plane on which the second nozzle plate lies.

* * * * *